April 28, 1964   D. F. SCHMID   3,130,660
GAS REMOVAL UNIT FOR ENSILAGE SILOS
Filed Jan. 24, 1962
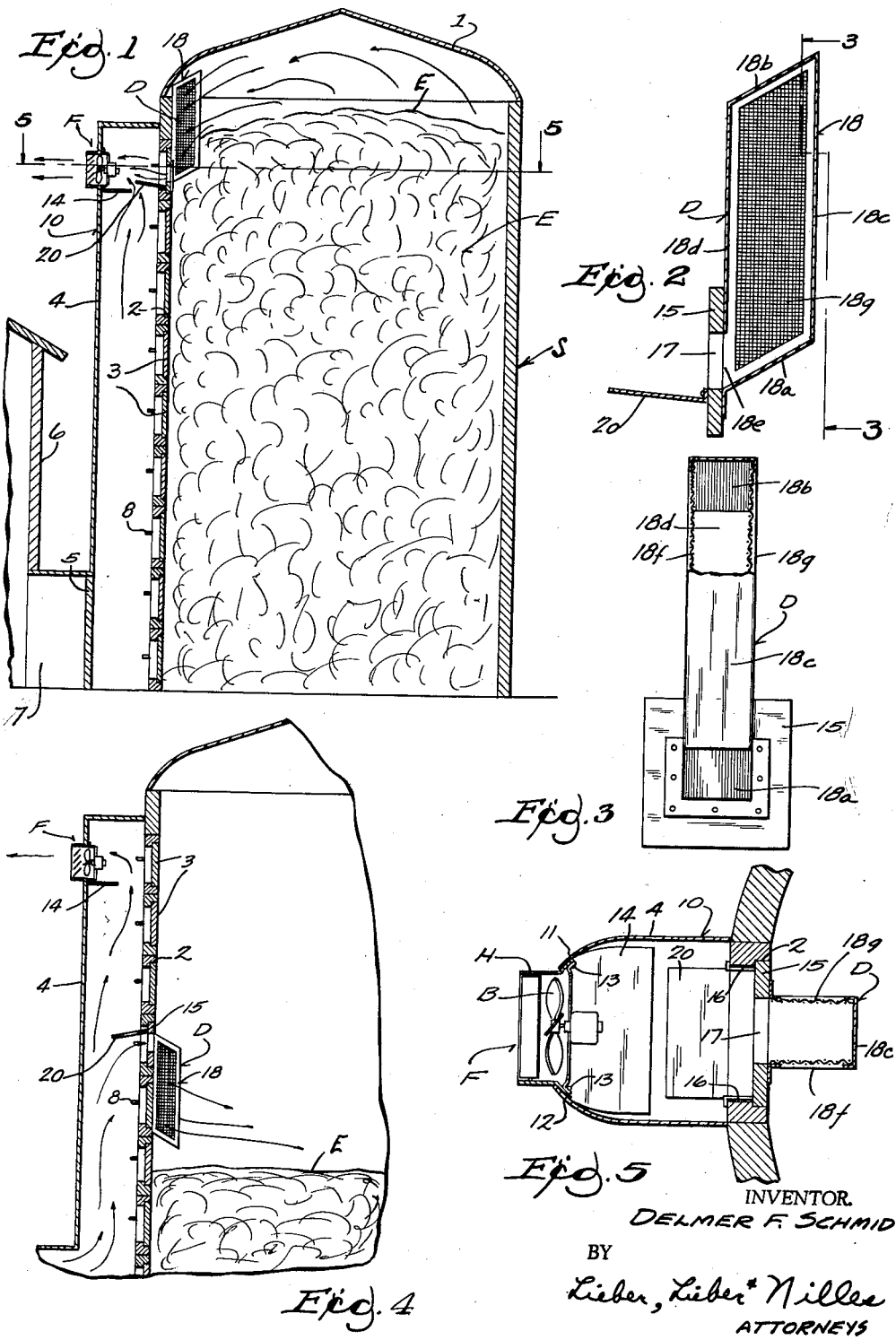
INVENTOR.
DELMER F. SCHMID
BY
Lieber, Lieber & Nilles
ATTORNEYS United States Patent Office 3,130,660
Patented Apr. 28, 1964

3,130,660
GAS REMOVAL UNIT FOR ENSILAGE SILOS
Delmer F. Schmid, Verona, Wis.
Filed Jan. 24, 1962, Ser. No. 168,368
11 Claims. (Cl. 98—54)

This invention relates generally to silos for storing green and moist ensilage, and which ensilage forms poisonous gases, such as nitrogen-dioxide, shortly after the silo is filled. This poisonous gas may remain in the silo and in the adjoining chute for several weeks after the silo has been filled. As this gas is heavy, it often seeps down the chute and into the connected barn where it kills the livestock. It is only after a considerable period of time after the silo has been filled that it is safe for the farmer to go into the chute or silo. This problem is compounded by the fact that silos of this type should not be ventilated by the passage of air therethrough because the ensilage would dry out, and it is desired to keep the ensilage in a moist and palatable condition. This problem is also aggravated by the fact that some farmers "cap" the top of the ensilage with an air-tight plastic cover in order to keep it moist, thereby trapping the poisonous gas in the ensilage and further preventing its dissipation.

It is desirable to remove these gases from the silo immediately in order that the ensilage may be properly covered or closed up to prevent spoilage, or to permit the installation of the silo unloader on top of the ensilage or otherwise remove the ensilage for feeding.

Accordingly, the present invention provides means for immediately and completely removing poisonous gases from both the silo and the chute without appreciably drying the ensilage. This means is so constructed and arranged that excessive heat loss from the barn and through the chute is prevented, and a balanced draft of air is provided from both the silo and its chute.

Another problem encountered in silos of the type to which the invention relates is freezing of a top layer of ensilage, particularly around the wall of the silo. This freezing can occur overnight during a period of non-operation of the silo unloader, and makes it difficult to again commence the silo unloading operation. It is desirable to be able to quickly thaw out this frozen layer of ensilage that forms particularly adjacent to the silo wall.

Accordingly, the above means for removing poisonous gas also permits rapid thawing of the ensilage without excessive drying thereof. More specifically, the gas removal means may be reversed as to its installation in the silo door, and it thereby permits the necessary heat to come up the chute from the barn and be directed into the silo and around the inside of the outer wall of the silo. In this manner, just a sufficient amount of barn heat is utilized to quickly thaw the frozen areas of the ensilage.

These and other objects and advantages of the invention will be apparent from the following detailed description, reference being had to the drawings, in which:

FIGURE 1 is a vertical, cross-sectional view of a silo employing the present invention;

FIGURE 2 is a fragmentary and enlarged view of a portion of the arrangement shown in FIGURE 1;

FIGURE 3 is a view taken along line 3—3 in FIGURE 2;

FIGURE 4 is a fragmentary view similar to FIGURE 1, but showing the thawing or reversed position of a portion of the gas removal means; and FIGURE 5 is a plan view of the fan and taken generally along the line 5—5 in FIGURE 1, but on an enlarged scale.

It should be emphasized at this point that the present invention relates to problems present in the storage and maintenance of chopped green and moist ensilage which cannot be permitted to dry out. This is in distinction to storage problems involved with tobacco, grain, hay, or the like, in which various ventilating systems have been proposed and used successfully for drying the crop and even heating it by means of ventilating and air recirculating ducts, baffles, and other air directing passages.

Referring in greater detail to the drawings, the cylindrical silo S may be formed of poured concrete or cement blocks and has a dome-shaped top 1 which may also be of concrete or fabricate from other material, such as sheet metal, as shown.

A series of identical, rectangular openings 2 are formed in vertical alignment along one side of the silo, which openings are closable by the similar and removable doors 3. These doors are removed successively downwardly as the ensilage E in the silo is removed therefrom by a silo unloader (not shown) or other means.

Secured vertically along one side of the silo and around the doors 3 is the vertical chute 4 which is formed from concrete, cement blocks, sheet metal, or the like. A door 5 usually places the lower end of the chute in communication with the interior of the barn 6 via a feed room 7. The farmer can climb up the chute by the ladder 8 fixed to the silo wall, and thereby enter the silo through any opening 2 from which its door 3 is removed, for unloading the ensilage by throwing it down the chute, or for inspection or other purposes.

Ordinarily, the lower door 5 in the chute remains closed, and the chute and silo are otherwise rather airtight in order to prevent the stored ensilage from drying out and spoiling.

As indicated in FIGURE 1, the silo is ordinarily filled as full as possible to the approximate level shown.

Shortly after the silo has been filled, deadly gases, such as nitrogen-dioxide, are generated by the ensilage. This gas persists for a considerable period of time and fills not only the upper end of the silo, but also seeps into and fills the chute. Furthermore, if the chute is not closed completely from the barn, this gas may seep into the barn and kill the livestock. Farmers who have attempted to enter the chute and silo too soon after filling of the silo have become violently ill, and loss of human life is not infrequent. As a result, and in spite of precautions in the past to keep doors and windows open around the feed room for ventilation, fatalities keep occurring.

It is therefore imperative to be able to completely and rapidly remove this poisonous gas from the upper portion of both the chute and the silo. This must be done without undue drying of the ensilage, so that the ensilage can be enclosed as soon as possible.

In accordance with the present invention, an electric fan unit F is installed in the upper end of the chute and acts to suck the air out of the chute and discharge it outside. The housing 10 of the fan has curved portions 11 and 12 (FIGURE 5) extending from opposite sides which complement the inside of the chute wall and are fastened thereto by screws 13 or the like.

Thus, the housing H extends through the chute wall and the fan blades B act to expel air from the chute and also from the silo, as will appear.

A removable duct unit D is insertable in any one of the openings 2 when its door 3 has been removed, and this unit is shown in FIGURE 1 when in the gas removing position, and is shown in FIGURE 4 in the thawing position.

This duct unit can be easily installed in or removed from any of the openings 2, and from the inside of the silo chute.

This duct unit comprises a panel 15 which fits snugly into openings 2 and is removably secured therein by brackets 16. A passage 17 is formed through panel 15 and communicates with the interior of the vertical duct 18. Duct 18 is formed generally from sheet metal and has a closed bottom 18a, closed top 18b, and closed inner side 18c. Outer side 18d is also closed except for the opening 18e by which the duct is in communication with the passage 17 in panel 15.

It will be noted that the two opposite sides 18f and 18g of the duct are formed of a screen material, such as metal, and thereby these two laterally facing sides are open. These open sides 18f and 18g permit the entry of air and gas from the silo into the duct and into the chute when the unit is positioned as shown in FIGURE 1. When the unit is installed as shown in FIGURE 4, warm air can pass from the chute through the duct and into the silo.

A baffle 14 is located directly beneath the fan unit and may either be attached directly thereto or to the chute wall. This baffle extends inwardly into the interior of the chute. The distance to which this baffle extends inwardly may vary depending on the balancing of the drafts to be provided for; however, in a chute having an interior width of about two to two and one-half feet, a baffle of a length of about thirteen inches has proved satisfactory with the arrangement as shown.

Attention is also directed to the fact that the duct 18 extends upwardly (FIGURE 1) a distance above its panel 15 and above the uppermost level of the ensilage. This insures that the gas trapped in the open area at the upper end of the silo is in communication with at least a portion of the open sides of the duct and can be drawn from the silo.

This tall vent or duct unit is installed before the silo is filled, and it is unnecessary for the farmer to climb into the silo and install it after silo filling has commenced.

It has been unsatisfactory to simply install a fan in the top of the silo for several reasons: (1) it would have to be installed or opened when the silo was filled in order for the ordinary farm operator to have access to this remote and high location; (2) a fan located in the top of the silo would not completely expel gases trapped in the chute; and (3) the fan and its associated openings must be closed after the gases have been removed from the silo.

The duct unit also has a deflector or baffle 20 which extends inwardly into the chute a distance of about eighteen inches for the arrangement shown and for the size of chute and baffle 14, previously indicated.

Of course, various numbers and arrangements of baffles may be employed and secured in place in other manners. With the arrangement as shown, however, the gas from the chute and from the silo follows the general paths indicated by the arrows in FIGURE 1, without causing the fan to suck too much air up the chute. On the other hand, the heavy gas flowing out of the duct unit does not fall down the chute, but instead is directed by the fan and out of the chute. Thus, nicely balanced and sufficient drafts of air are created in the silo and chute. Without any deflectors or baffles, it has been found that too much air was taken from the chute while an insufficient amount was drawn from the silo.

During the colder months of the year and when the silo has been partially unloaded, the unit may be used to draw warm air from the barn through the then open door 5, and direct this air into the silo for thawing. This arrangement is shown in FIGURE 4 when the unit is installed in one of the lower openings 2 and adjacent the frozen top of the ensilage. When in this position, the baffle 20 acts to deflect the upwardly moving warm air, as indicated by the arrows, into the duct 18. This warm air is then deflected laterally outwardly through the open sides 18f and 18g of the duct and along the inside of the outer wall of the silo. With this arrangement, the warm air is most efficiently used to thaw those areas of ensilage which need the warm air most. As indicated by other arrows in FIGURE 4, some of the warm air is also sucked by the fan directly out of the upper end of the chute.

By means of the present invention, a simple and easily installed means has been provided for immediately and completely removing deadly gas from both a silo and its associated chute. This is accomplished without permitting other ventilation and consequent drying of the ensilage in an otherwise closed silo.

The same unit can also be used to efficiently direct warm air from the adjacent barn and to those areas of the ensilage in the silo which require thawing.

Under any conditions of operation, a balancing of air drafts is provided for most efficient, effective, and safe operation.

Various modes of carrying out the invention are contemplated as being within the scope of the following claims particularly pointing out and distinctly claiming the subject matter which is regarded as the invention.

I claim:

1. A closed ensilage silo for storing green and moist ensilage and preventing free circulation of air therethrough, a vertical chute along one side of said silo, an exhaust fan at the upper end of said chute, a duct unit removably securable to said silo and located within said chute and placing said silo in gas delivering communication with said chute whereby said fan acts to draw gas both from said silo and from said chute and expel said gas from said upper end of said chute, and means for securing said unit to said silo.

2. A closed ensilage silo for storing green and moist ensilage and preventing free circulation of air therethrough, a vertical chute along one side of said silo, an exhaust fan at the upper end of said chute, a duct unit removably securable to said silo and located within said chute and placing said silo in gas delivering communication with said chute whereby said fan acts to draw gas both from said silo and from said chute and expel said gas from said upper end of said chute, said duct unit comprising a baffle extending into said chute and a duct extending into said silo, and means for securing said unit to said silo.

3. A device as defined in claim 2 further characterized in that said duct is elongated and extends upwardly in said silo, and has two opposite and perforated sides for permitting passage of gas therethrough but prevents the passage of ensilage into said duct.

4. A closed ensilage silo for storing green and moist ensilage and preventing free circulation of air therethrough, a vertical chute along one side of said silo, a series of vertically aligned and closable openings in said silo and located within said chute, an exhaust fan at the upper end of said chute, a duct unit removably securable in any one of said openings for placing said silo in gas delivering communication with said chute whereby said fan acts to draw gas both from said silo and from said chute and expel said gas from said upper end of said chute, and means for securing said duct unit in said openings.

5. A closed ensilage silo for storing green and moist ensilage and preventing free circulation of air therethrough, a vertical chute along one side of said silo, a series of vertically aligned and closable openings in said silo and located within said chute, an exhaust fan at the upper end of said chute, a duct unit removably securable in any one of said openings for placing said silo in gas delivering communication with said chute whereby said fan acts to draw gas both from said silo and from said chute and expel said gas from said upper end of said chute, means for securing said unit in said openings, said duct unit comprising a baffle extending into said chute, and an elongated duct extending upwardly into said silo.

6. A closed ensilage silo for storing green and moist ensilage and preventing free circulation of air therethrough, a vertical chute along one side of said silo, a series of vertically aligned and closable openings in said silo and located within said chute, an exhaust fan at the upper end of said chute, a duct unit removably securable selectively in any one of said openings and having a passage placing said silo in communication with said chute, said unit having a baffle adjacent one end and extending into said chute, said unit being securable in said openings in one position in which said baffle is located beneath said passage to cause said fan to draw gas both from said silo and from said chute and to expel said gas from said upper end of said chute, and said unit being securable in said opening in a second position which is reversed from said one position whereby said baffle is located above said passage to cause air induced upwardly by said fan to be deflected into said silo via said passage, and means for selectively securing said unit in said openings.

7. As an article of manufacture, an air duct unit comprising, a panel having a passage therethrough, a baffle secured to one side of said panel, at one side of said passage, and extending outwardly therefrom, and an elongated duct secured to the other side of said panel and in communication with said passage, said duct extending from said passage in a direction away from said baffle.

8. As an article of manufacture, an air duct unit comprising, a panel having a passage therethrough, a baffle secured to one side of said panel, at one side of said passage, and extending outwardly therefrom, an elongated duct secured to the other side of said panel and in communication with said passage, said duct extending from said passage in a direction away from said baffle, said duct having two opposite and perforated sides for directing air in opposite directions.

9. A dual purpose air duct unit for use with a closed ensilage silo having a chute along one side thereof and a series of closable openings therebetween, said unit comprising a panel adapted to be removably securable in any one of said openings and selectively in a gas removing position and an ensilage thawing position, said panel having a passage therethrough for placing said silo in communication with said chute, a baffle secured to one side of said panel, and adjacent one end thereof, and adapted to extend into said chute, and a duct secured to the opposite side of said panel in communication with said passage and adapted to extend into said silo, whereby when said unit is in said gas removing position said baffle is located beneath said passage, and when said unit is in said thawing position said baffle is located above said passage.

10. A poisonous gas removal system for use with a closed silo of the type for storing green and moist ensilage and having a vertical chute along one side of said silo, said system including an exhaust fan at the upper end of said chute, and a duct unit adapted to be removably securable to said silo and located within said chute and placing said silo in gas delivering communication with said chute whereby said fan acts to draw gas both from said silo and from said chute and expel said gas from said upper end of said chute.

11. A poisonous gas removal system for use with a closed silo of the type for storing green and moist ensilage and having a vertical chute along one side of said silo, a series of vertically aligned and closable openings in said silo and located within said chute, said system including an exhaust fan at the upper end of said chute, and a duct unit adapted to be removably securable selectively in any one of said openings and having a passage placing said silo in communication with said chute, said unit having a baffle adjacent one end thereof and extending into said chute, said unit being securable in said openings in one position in which said baffle is located beneath said passage to cause said fan to draw gas both from said silo and from said chute and to expel said gas from said upper end of said chute, and said unit being securable in said opening in a second position which is reversed from said one position whereby said baffle is located above said passage to cause air induced upwardly by said fan to be deflected into said silo via said passage.

References Cited in the file of this patent

UNITED STATES PATENTS

| | | |
|---|---|---|
| 1,782,675 | Bayley | Nov. 25, 1930 |
| 2,305,423 | Heuser | Dec. 15, 1942 |